United States Patent Office 3,080,376
Patented Mar. 5, 1963

3,080,376
PREPARATION OF POLYISOINDOLENINES
Hans Paul Kaufmann, Munster, Germany, assignor to Deutsche Advance Produktion G.m.b.H., Marienberg, near Bensheim, Germany
No Drawing. Filed Oct. 26, 1959, Ser. No. 848,543
Claims priority, application Germany Oct. 27, 1958
6 Claims. (Cl. 260—314.5)

The invention relates to novel polymerization catalysts and to methods for their preparation.

Some metals, particularly cobalt, lead, and manganese, have long been used in the form of their napthenates, resinates, and salts of long-chain aliphatic acids to accelerate the rate of molecular size increase of organic compounds. As driers, said metal compounds promote the film formation of drying oils and many synthetic resins which contain unsaturated fatty acids, by liberating the oxygen of peroxides or hydroperoxides formed in the drying process. For the same reason, said metal compounds act as "promoters" in the polymerization and copolymerization of unsaturated compounds in the presence of suitable peroxides or hydroperoxides. An example is the curing of unsaurated polyesters in mixture with styrene.

Heretofore, it was believed that the type of chemical linkage of the recited metals in the driers was of little importance. However, it was found that said assumption was not correct. Iron in complex linkage, for instance, may be much more effective than iron in the form of organic salts.

It is, therefore, a principal object of the invention to provide complex iron salts of improved efficiency as polymerization catalysts.

It is another object of the invention to provide suitable methods for the preparation of such complex iron salts.

Other objects and advantages will be apparent from a consideration of the specification and claims.

The novel polymerization catalysts are iron-III-complex salts of polynuclear isoindolines, which may have a chain or a ring structure ("polyisoindoline"). Such polyisoindolines are built up from monomeric units of the following structures Isoindoline     Isoindolenine whereby they may contain only one or both of such units.

The compounds may be prepared by reaction of urea, phthalic anhydride, or phthalodinitrile, or substitution products thereof, ammonium nitrate, and a ferro salt under oxidizing conditions, or by reaction of a polyisoindolenine with a ferric salt; another method consists in oxidation of ferro-complex compounds of polyisoindolenines at a temperature of 50 to 180° C.

Particularly efficient is the ferri-complex compound of a six ring system in which a bis-(diiminodihydroxy-isoindoline) is as ansa-group linked to a diimino-di-aza-dihydroxy-cyclotetra-isoindolenine. Said compound may be designated as iron (III)-bis (ansa-dihydroxy-diamino-isoindoline - )dihydroxy - diamino-diaza-cyclo-tetraisoindoline. (The term "ansa" is used to designate bridged ring compounds in which aromatic systems are bridged at unusual positions (e.g. meta, para, amphi) with other rings.)

The following examples illustrate the preparation of the ferricomplex compounds of polyindolines or polyisoindolenines. The terms "polyisoindolines" and "polyisoindolenines" are used at present rather indiscriminately to designate compounds containing units of either structure illustrated in the formulae given above. Actually, the term "polyisoindolenine" is sometimes not quite correct when compounds thus designated contain the dihydroisoindole ring but no double bond in the heterocyclic ring. Anyhow, the nomenclature used in the specification and claims is intended to cover any polymer or mixed polymer irrespective which of the above recited units it contains. All parts are given by weight.

Example 1

400 parts of urea, 70 parts of phthalic anhydride, 35 parts of ammonium nitrate, 15 parts of ferrous sulfate, and 0.5 part of ammonium molybdate are heated in nitrobenzene for about 5 hours at 180° C., with stirring and passage of air through the batch. The undissolved matter is filtered off and extracted with chloroform. The filtrate and the chloroform extract are substantially freed from the solvents by vacuum distillation. The obtained residue is dissolved again in a small amount of chloroform, and precipitated with low boiling benzine. In this manner, an iron hexaindoline compound is obtained as a brown powder containing 5.8 percent of iron, which compound is iron (III)-bis-(ansa-dioxy-diamino-isoindolino-) dioxy-diamino-diaza-cyclotetraisoindoline.

Instead of phthalic anhydride, substitution products thereof may be employed. Analogous compounds are obtained by heating phthalodinitrile or its substitution products, ammonium molybdate and ferrous sulfate with addition of oxidizing agents.

Example 2

Amino-dimethoxy-tetraisoindolenine is dissolved in benzene, and to the solution there is added the equivalent amount of anhydrous ferric chloride, dissolved in acetone. A brown ferric complex salt of polyisoindoline is precipitated, which can be purified by a treatment with ether.

Example 3

10 parts of ferro-phthalocyanine, 6.75 parts of phthalodinitrile, and 0.05 part of ammonium molybdate are suspended in 50 parts of nitrobenzene, and a vigorous stream of air or oxygen is passed for 6 to 10 hours at 150–160° C. through the suspension. Subsequently, the batch is filtered, and the nitrobenzene is distilled off. By extracting the residue with chloroform and distilling off said solvent, a brown iron (III) complex salt of polyisoindolenine containing about 6.3% Fe is obtained in a yield of about 85 percent.

Iron complex salts of the character described catalyze the autoxidation of drying oils much more efficiently than, for instance, iron naphthenate or iron octoate. This effect is observed particularly in connection with oils containing conjugated unsaturated fatty acids in the glyceride molecule, such as, for instance, tung oil. The novel complex salts are powerful promoters already in lowest concentrations, as shown by the following examples where the compound of Example 1 was used as drier or catalyst. The metal percentage figures are calculated on the weight of the composition to be dried or polymerized.

Example 4

To sample of a lacquer linseed oil, there were added 0.002 percent of iron, either as iron naphthenate, or in the form of the hexaindoline complex of Example 1. The drying time in the latter case was half that of the drying time when the naphthenate was used.

Example 5

A mixture consisting of 5 parts of soybean oil and 2 parts of tung oil required a drying time of about 70 hours when cobalt or iron naphthenate were used as driers in an amount of 0.002 percent, calculated on metal. If the same amount of iron was added in the form of the hexa-indoline complex, the drying time was cut to 5 hours.

*Example 6*

A lacquer composition consisting of one part of alkyd resin and 2 parts of linseed oil dried within 5 hours when the iron complex salt of Example 1 was added in an amount corresponding to 0.002% of iron. The same addition of iron in the form of iron naphthenate required a drying time of 36 hours.

*Example 7*

A mixture of 30 parts of polyester, 5 parts of styrene, and 1 part of cyclohexanone peroxide, gelled in 25 minutes when cobalt naphthenate corresponding to 0.01% metal had been added.

If, instead of the cobalt naphthenate, iron was employed in an amount of 0.003% metal, in the form of the complex salt of Example 1, the gelling time was 10 minutes.

*Example 8*

Acrylonitrile, to which 1 percent of cyclohexanone peroxide and 0.001 percent of iron in the form of the recited complex salt had been added, heated up spontaneously within a few minutes to an explosive decomposition, while the same metal amount in the form of cobalt octoate produced only a slight polymerization.

If only 0.0005 percent of iron was added in the form of said complex salt, a pure white polymer was formed within about 10 minutes. Cobalt and iron octoate did not show any effect at said low concentrations.

Similar results were obtained with other polymerizable compounds, for instance vinyl acetate.

The novel iron complex compounds may also be used in combination with conventional driers, for instance, in mixture with about ten times the amount of lead or manganese driers.

I claim:
1. The method of preparing iron (III) polyisoindolenines, comprising heating phthalic anhydride with urea and ammonium nitrate with ferrous sulfate in the presence of oxygen, and ammonium molybdate as catalyst at a temperature of 100 to 200° C.
2. The method as claimed in claim 1, wherein the reaction is carried out in nitrobenzene.
3. The method of preparing iron (III) polyisoindolenine comprising heating phthalodinitrile with ammonium molybdate and ferrous sulfate at a temperature of 100 to 200° C. in the presence of oxygen.
4. A method of preparing a polymerization catalyst comprising dissolving amino dimethoxy tetraisoindolenine in benzene, adding an about equivalent amount of anhydrous ferric chloride dissolved in acetone, and recovering the thus obtained brown precipitated ferric complex salt.
5. A method of preparing iron (III)-polyisoindolenine comprising preparing a suspension of ferrous phthalocyanine and phthalodinitrile in nitrobenzene, adding a small amount of ammonium molybdate as catalyst, passing oxygen at a temperature of 150 to 160° C. through said suspension, filtering, and distilling off the nitrobenzene.
6. A method of preparing iron (III) polyisoindolenine comprising preparing a suspension of ferrous phthalocyanine and phthalodinitrile in nitrobenzene, adding a small amount of ammonium molybdate as catalyst, passing air at a temperature of 150 to 160° C. through said suspension, filtering, and distilling off the nitrobenzene.

References Cited in the file of this patent
UNITED STATES PATENTS
2,795,586     Whelen  ---------------- June 11, 1957